United States Patent [19]

Dominguez-Gutierrez

[11] Patent Number: 5,458,238
[45] Date of Patent: Oct. 17, 1995

[54] ASSEMBLY BOX TO CONTAIN CASES FOR COMPACT DISKS, AUDIO CASSETTES OR VIDEO CASSETTES

[76] Inventor: Eugenio Dominguez-Gutierrez, Arqueologos No. 53, Col., El Retoño, 09449, Mexico

[21] Appl. No.: 226,570

[22] Filed: Apr. 12, 1994

[51] Int. Cl.⁶ .......................... B65D 85/57; B65D 85/672
[52] U.S. Cl. ................ 206/387.14; 206/387.15; 206/307.1; 206/308.3; 220/4.28; 220/7
[58] Field of Search ................ 206/387, 309, 206/307, 311, 312, 313, 444; 220/4.28, 4.31, 4.32, 4.33, 7; 312/257.1, 263, 265.5, 9.1, 9.9

[56] References Cited

U.S. PATENT DOCUMENTS

4,782,972  11/1988  Wenkman et al. ............... 312/263 X
4,867,327   9/1989  Roland .......................... 220/4.28 X
4,934,531   6/1990  Chen ............................ 220/4.28 X
5,050,734   9/1991  Chen ............................ 206/309 X
5,320,244   6/1994  Yu ............................... 206/309 X

Primary Examiner—Jacob K. Ackun
Attorney, Agent, or Firm—Ladas & Parry

[57] ABSTRACT

The present invention relates to a new type of assembly box to store jewel boxes for compact disks (CD's), audio cassettes and video cassettes. The box comprises several pieces assembled with each other repeatedly to conform said box. The necessary pieces to form the box are of five different types each one having a different function within the system.

13 Claims, 12 Drawing Sheets

ASSEMBLY BOX TO CONTAIN CASES FOR COMPACT DISKS, AUDIO CASSETTES OR VIDEO CASSETTES

BACKGROUND OF THE INVENTION

The idea of having some type of box or furniture to keep jewel boxes for compact disks (CD's), audio cassettes and video cassettes already exists. Articles of this type have different shapes and sizes already defined. And such come from the cases having compartments or grooves keep in a set position to the cases for compact disks, audiocassettes and videocassettes, with the much more complex and sophisticated furnitures. These articles have different shapes and are generally of sizes already defined as to house a predetermined amount of cases.

In contrast to the already known models, the box object of the present invention, is formed with pieces of a size substantially smaller, which are assembled between each other, to produce an assembled box which is totally different to that already known.

The advantages established by the present invention over those already existing, are several. The main advantages are: These boxes are assembled from five different types of shapes, thus it is not necessary to make a substantial disbursement to obtain boxes having an already defined size and that most often do not adjust to the user's requirements. With the present invention, boxes of a desired size and capacity can be assembled, as it is possible to obtain separately the pieces and each time required, making small disbursements, to build boxes that grow according to the user's requirements, as these boxes can be bigger horizontally or vertically according to the number and type of to assemble same pieces used. Also there is the advantage of being able to keep the desired number of single or double cases for compact disks since the boxes can be assembled with different types of pieces.

DETAILED DESCRIPTION OF THE INVENTION

The invention provided, refers to an asembly box to keep cases for compact disks. Said box comprising the junction of six types of several pieces (30, 40, 50, 60, 70 y 80), assembled between each other in a way that the assembly process and the form of said pieces constitute an unique and peculiar inventive concept.

Five of the different pieces, such as the corner piece (30), the corner piece (40), the double planar piece (50), the single planar piece (60) and the floor or roof piece (70) have the same assembly system, which will described below. This system can be viewed in detailed in the FIGS. 2, 3, 4, 5, 6, 7, 8, 9, 10, 11, 12, 13, 14, and 15, in which there are represented pieces (30), (40), (50), (60) y (70) respectively).

In the Figures it can apreciated that said pieces have teeth (31) in their longitudinal ends. These teeth repeat lengthwise in each one of the pieces and have the same side and separated by equal distances.

Each one of the teeth (31), has a peak (32) at the begining of the tooth and a groove (33) at the end thereof, serving to retained one piece with an other. At the end of the longitunidal part of the pieces, there can be seen some partial teeth (34) y (35) serving to retain the last teeth (31) of the piece to assemble. When assembled, the pieces joing the teeth of one with the teeth of another and this forms the borders (36) apreciated in FIG. 1, serving to retain in place the cases for compact disks, audiocassettes and videocassettes.

Figure 3:
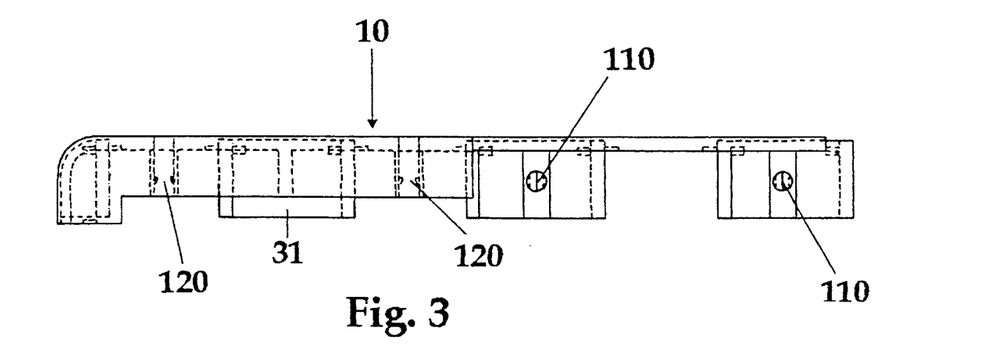
FIG. 3 is a sectional view of one of the two portions forming the pieces constituting two of the box corners.
Figure 4:
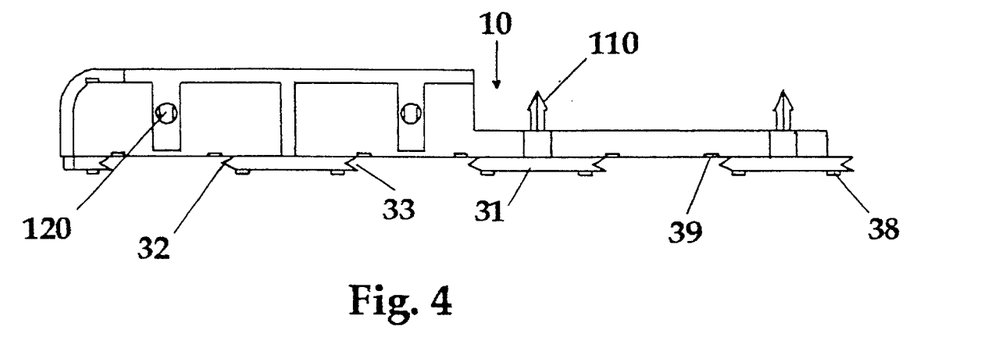
FIG. 4 is a top plan view of the piece of the previous Figure.
Figure 5:
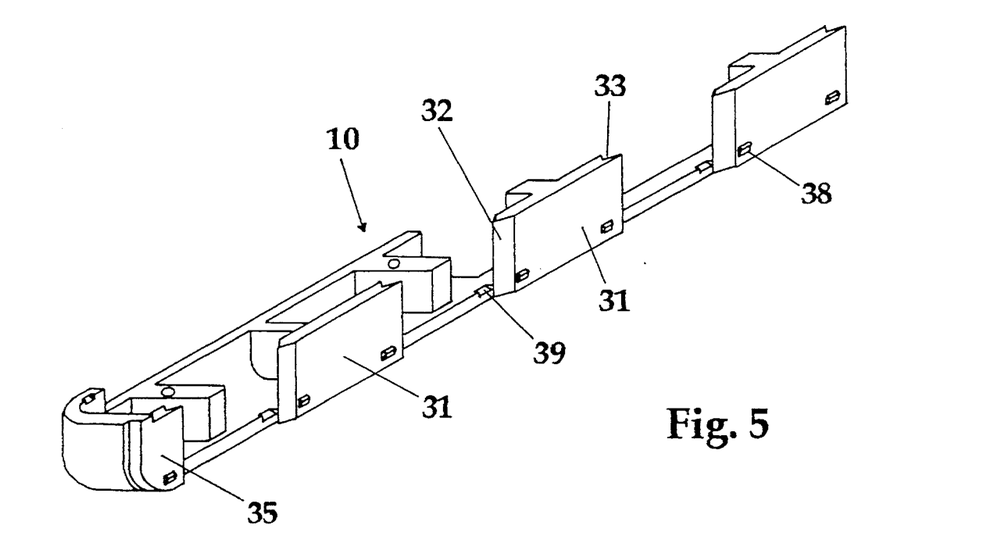
FIG. 5 is a conventional perspective view of the piece shown in FIGS. 3 and 4.
Figure 6:
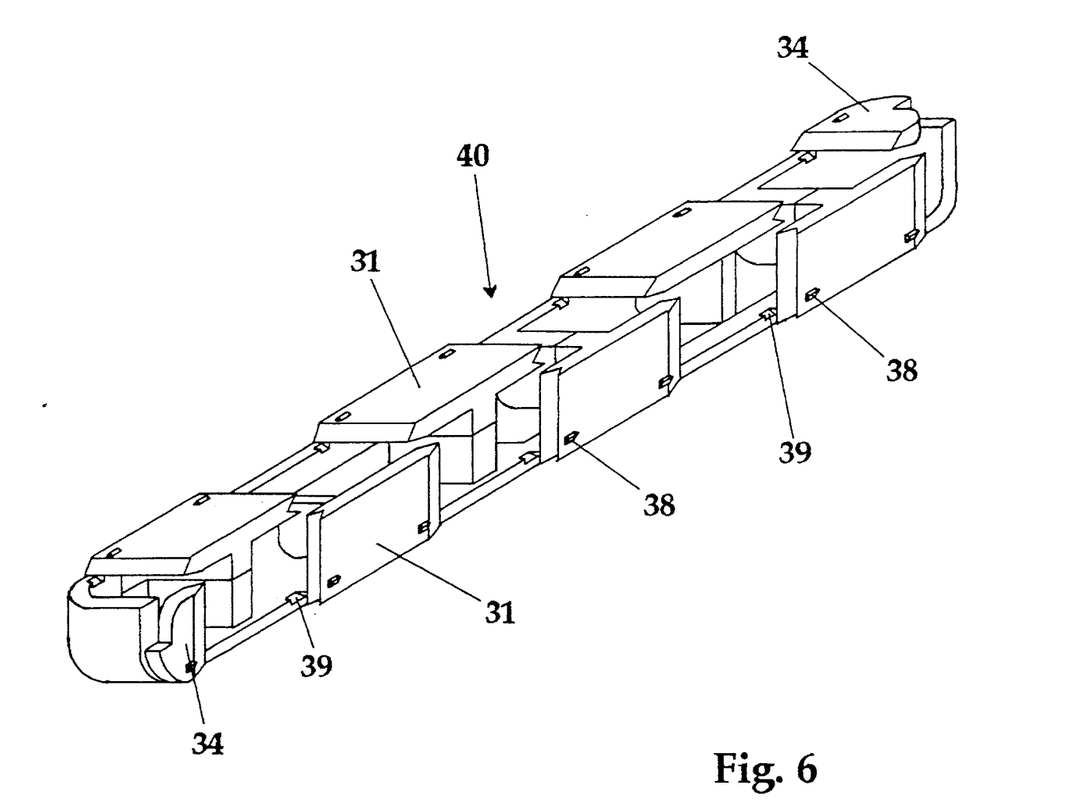
FIG. 6 is a perspective view of the other piece forming the other two corners of the box.
Figure 7:
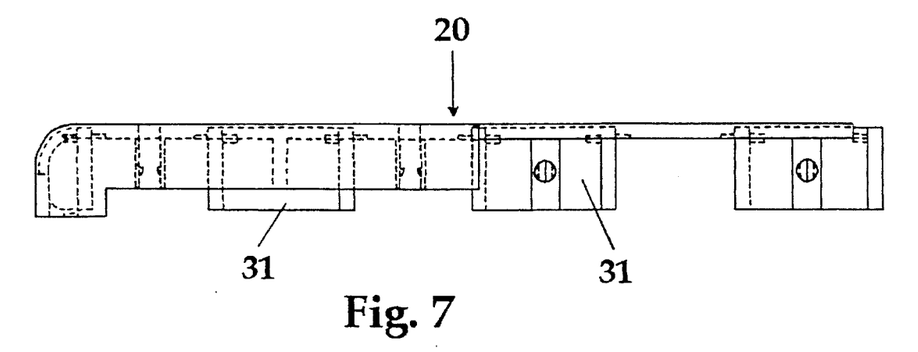
FIG. 7 is a sectional view of one of the two portions forming the pieces constituting the other two corners of the box.
Figure 8:
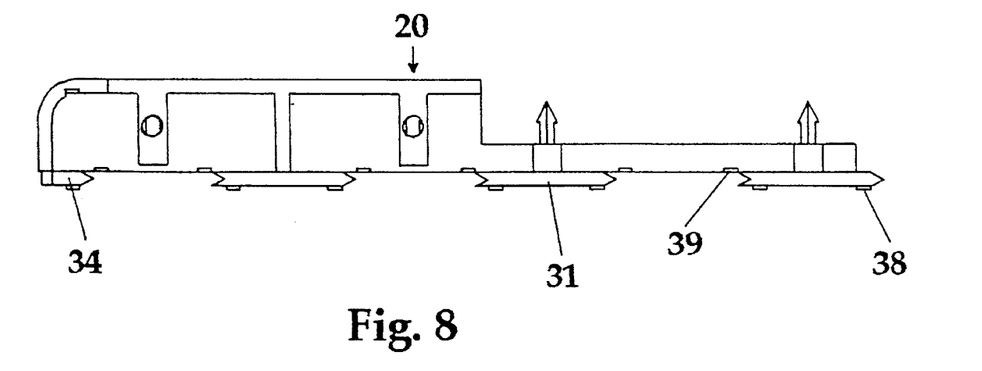
FIG. 8 is a upper plan view of the piece of the previous Figure.
Figure 9:
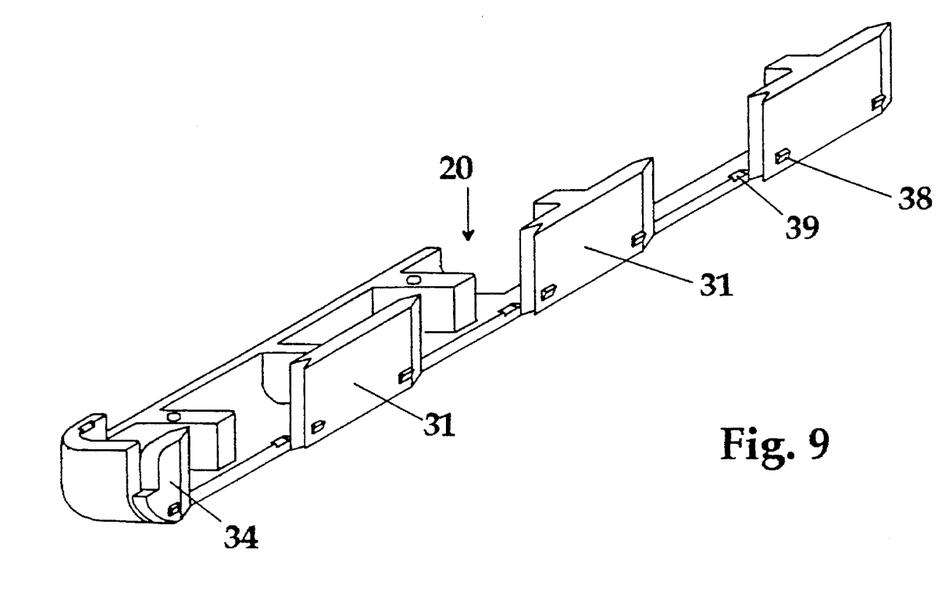
FIG. 9 is a conventional perpective view of the piece shown in FIGS. 7 and 8.

The piece (10) shown in FIGS. 3, 4 and 5 is a symmetrical half of the corner (30). When asembling two pieces (10) with an integral system of sheet metal screws (110) entering by pressure in orifices (120), the corner piece (30) is formed. Same happens with the piece (20) shown in FIGS. 7, 8 y 9 which is symmetrical half of the opposite corner (40). When assembling two pieces (20) with a integral system of orifices and sheet metal screws by pressure, the opposite corner piece (40) is formed, having an opposite orientation to the corner piece (30).

There are two types of corners in the box, since there is a change in the orientation of the cuts (32 and 33) on teeth (31) and of the cuts and peaks of the half teeth (34 and 35), being this necesary for assembling the whole box.

The reason by which the corner pieces (30 and 40) are formed from two equal pieces, is the mould construction and injection of such pieces, since is it not possible to make such pieces in a complete form.

Figure 1:
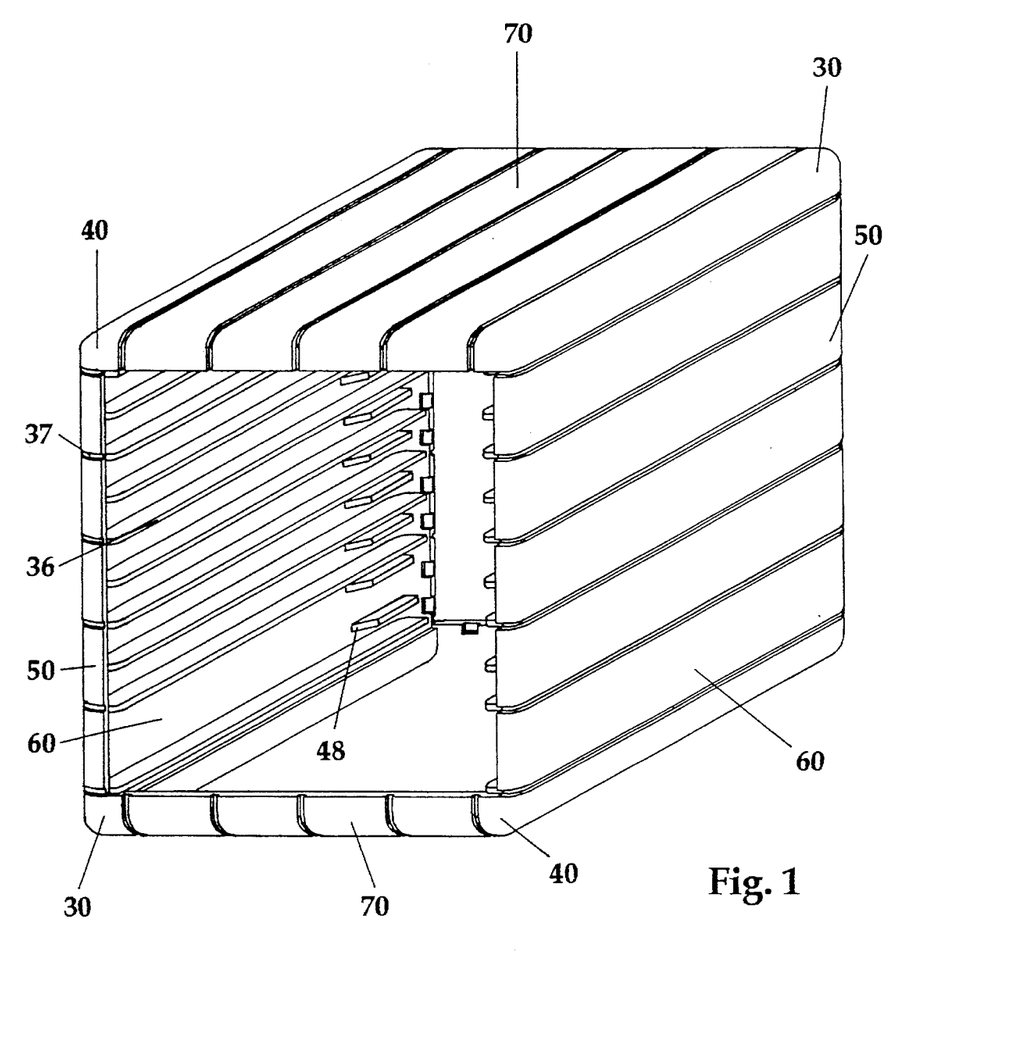
FIG. 1 is a perspective view of the box already assembled.
Figure 2:
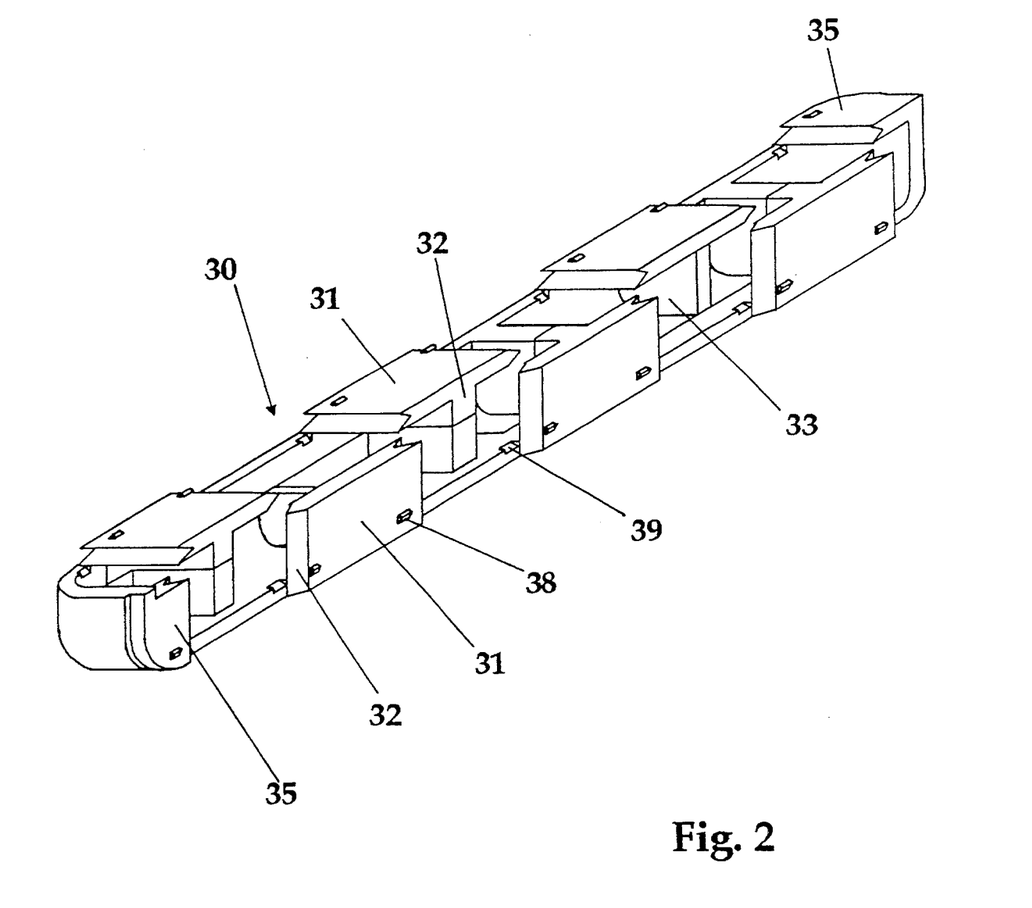
FIG. 2 is a perspective view of one of the pieces forming two of the box corners.
Figure 10:
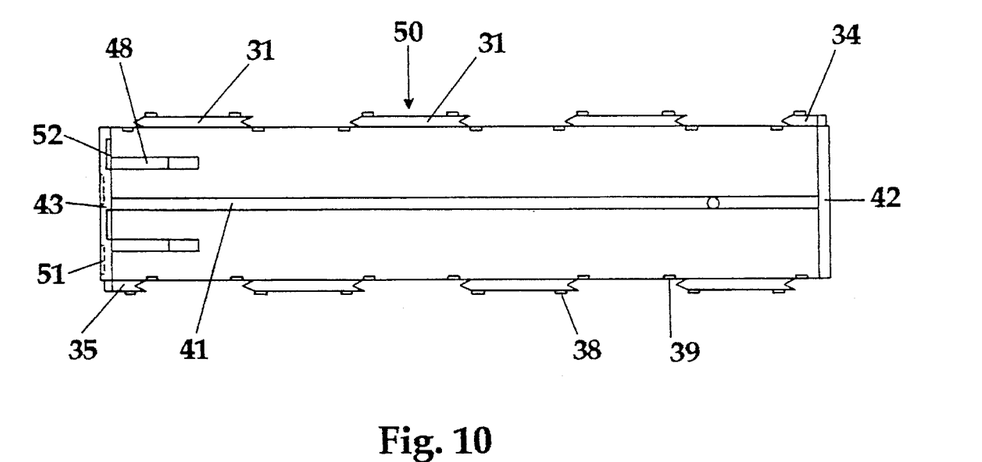
FIG. 10 is a plan view of a double planar piece.
Figure 11:
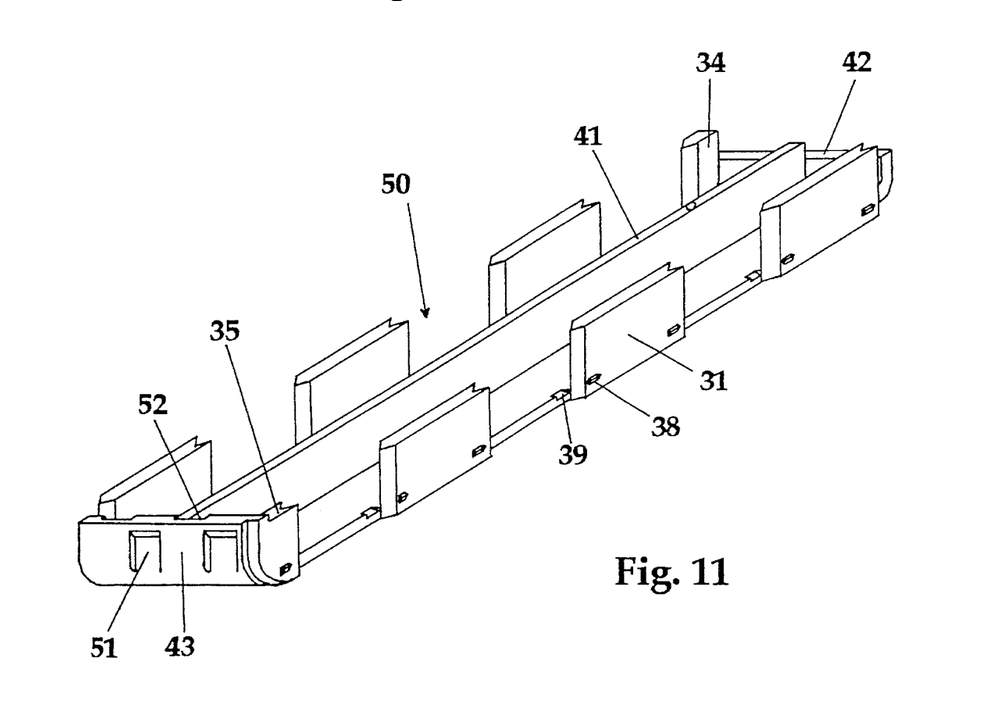
FIG. 11 is a perspective view of the piece of the prior Figure.

Pieces (50) and (60) are practically equal except for the diference that the piece (50) besides of having teeth in the longitudinal end, has a vein (41) as can be appreciated in FIGS. 1, 10 and 11. This vein (41) is located longitudinally in the center of the piece and forms a support to retain the cases for single compact disks.

The pieces (50) and (60) have slopes (48) serving to give an entrance boundary to the cases, since the wall 43 has a certain curvature radius it may cause that the cases enter in a non-uniform manner.

Figure 12:
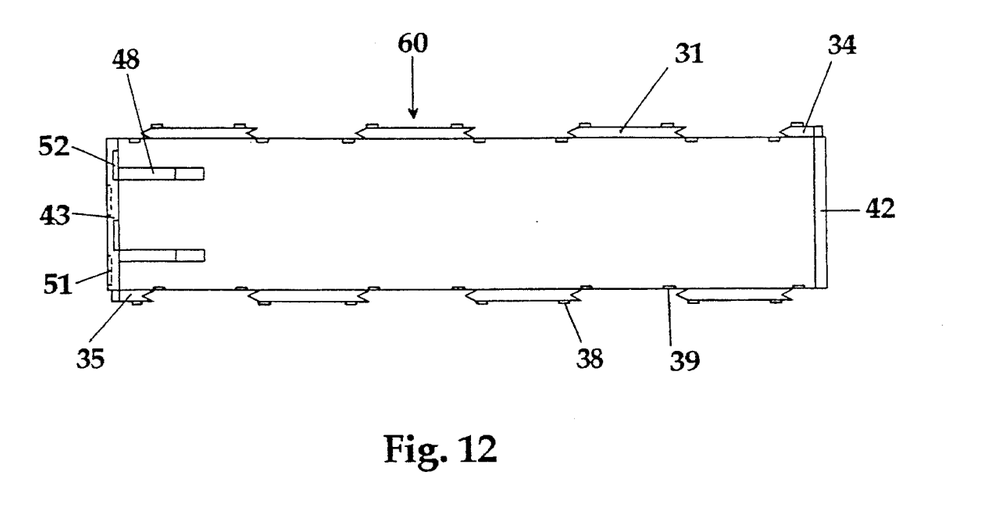
FIG. 12 is a plan view of a single planar piece.
Figure 13:
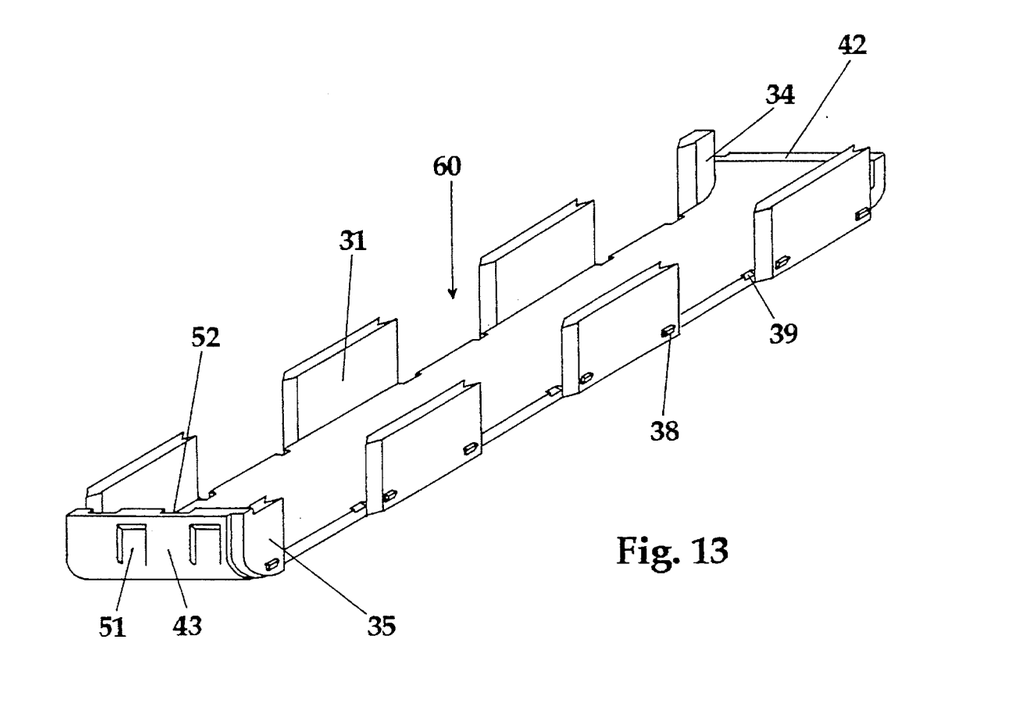
FIG. 13 is a conventional perspective view of the piece of the prior Figure.
Figure 14:
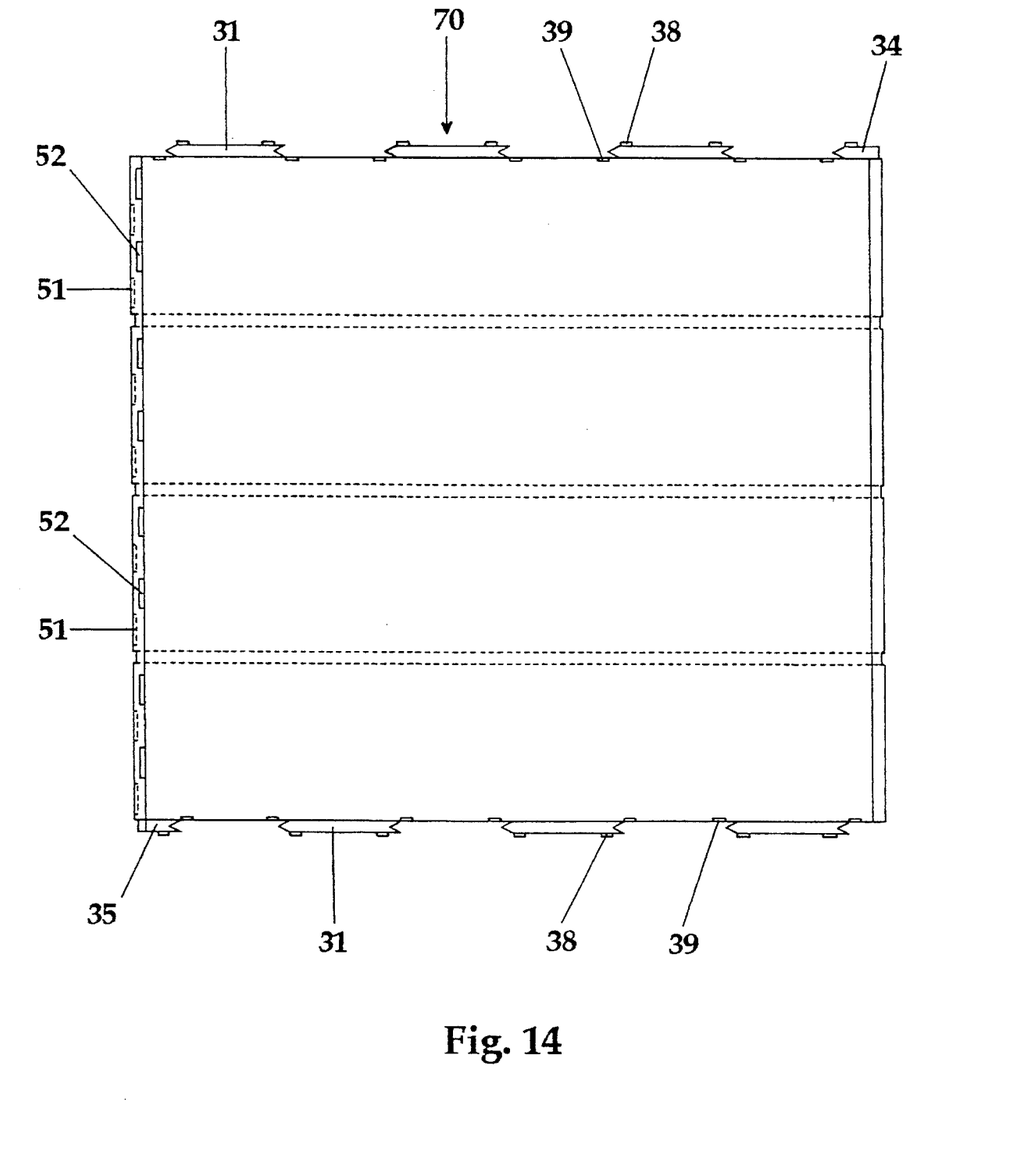
FIG. 14 is a plan view of the top or floor of the box.
Figure 15:
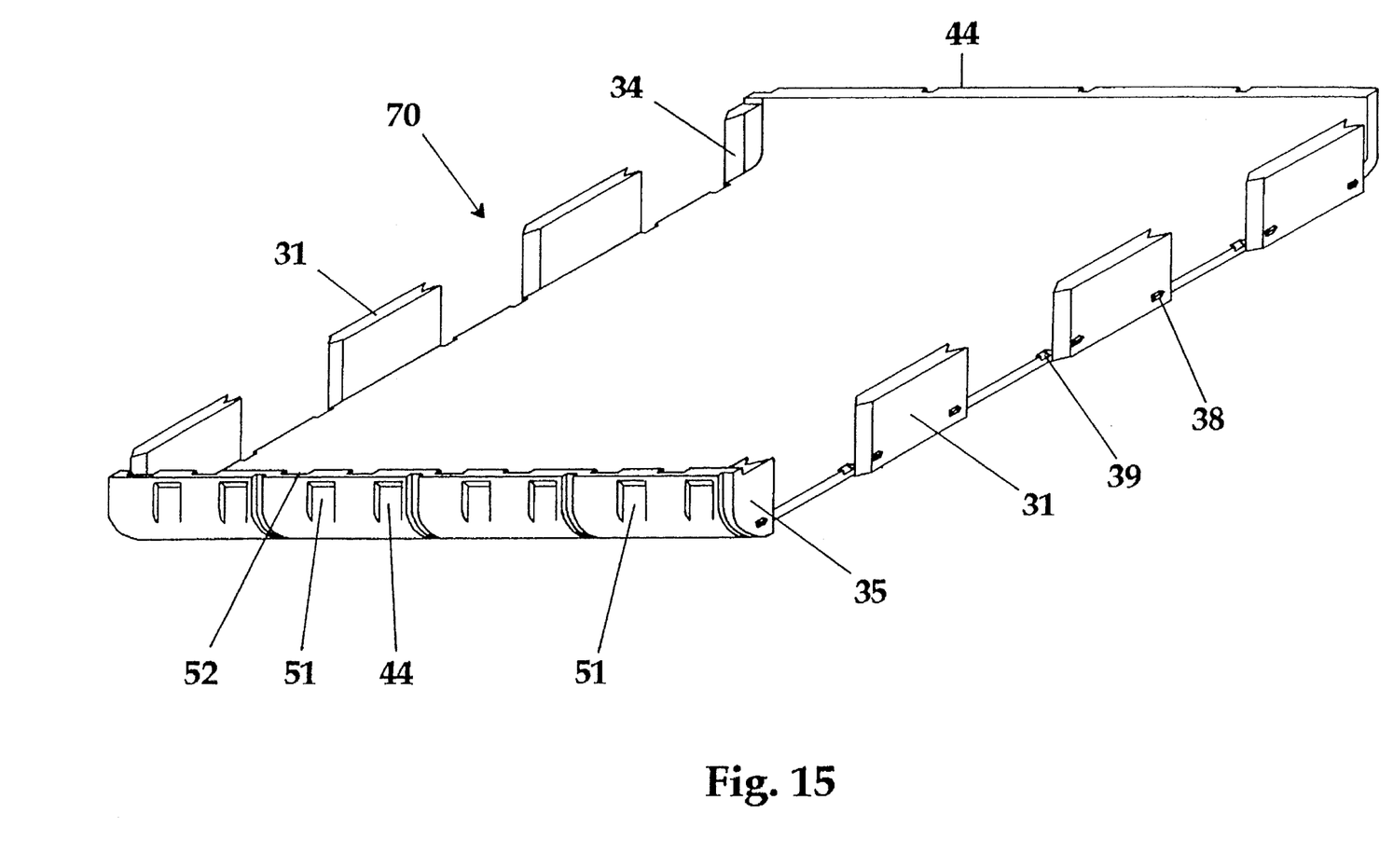
FIG. 15 is a conventional perspective view of the piece of the prior Figure.

The piece (60) represented in FIGS. 12 and 13, has no center vein, thus, it permits enough space to store double compact disc cases.

Corners (30 and 40) contain the same assemble parts of the other three types of pieces (50, 60 y 70) but they differ in having the teeth (31) and half teeth (34 y 35) of one side located perpendicularly to the teeth of the other side in order to be able to join the base or top with the lateral walls of the box.

Pieces (50 and 60) have small walls (42 and 43) in the short ends of such pieces. In FIGS. 10, 11, 12 and 13 it can be seen that there is a front wall 43 having a very small height which forms the front border of the box, wherein the cases of the compact disks are introduced. In the other short end of the piece there is another wall 42 of a bigger height serving to retain the compact disk cases in the back part of the box so that they cannot gare off by such end.

The piece (70) which is the one used indistinctively to form the base or the top of the box, has a front wall (44a) and a back wall (44b), which are equal, with the purpose of giving continuity to the corners, providing a good presentation to the box.

In FIG. 1, there can be seen the different types of pieces constituting the box. In this Figure with the number (37), there are indicated in the external part, the divisions of one piece with another and also the place in which one piece is assembled to another. In the base and top of the box, formed by the piece 70, there are also shown grooves running across the external part of the box. The three grooves located in the center of the piece 70, are merely to give presentation to the box, since here there are no joined pieces. It also can be seen that pieces (30 and 40) are those forming the corners of the box. These corner pieces serve to join the horizontal pieces with the vertical pieces.

Pieces (50) are shown in FIG. 1 forming the vertical walls of the box. This vertical walls are formed by several pieces (50) assembled one with each other. The pieces (60) also can form the vertical walls of the box. Such walls can be formed assembling the pieces (50) and (60) in any order according to the needs of the consumer. In FIG. 1, it can be seen that most of the pieces forming the lateral walls are single disc storing lateral walls (50) with the exception of the bottom part of the lateral wall, which is formed by a double disc storing lateral wall (60).

As an example, mention can be made that in order to form compartments for single cases of compact disks, double pieces (50) should be used which due to the longitudinal central vein (41) provide the necessary space to slide two single cases in the channels formed in such piece. For storing double cases for compact disks it is more convenient to use single pieces (60), which do not have the central vein (41), thus allowing easy access of the cases of this type.

Stop tooth (38) shown in FIGS. (2, 4, 5, 6, 8, 9, 10, 11, 12, 13, 14 and 15) serves to avoid sliding and to keep the pieces in position (30, 40, 50, 60 and 70), which are joined to each other by teeth (31). Such stop tooth (38) is joined to the other piece by entering a notch (39) made for such purpose.

The reinforcement element of the box (80) is shown in FIGS. 16, 17, 18, 19 and 20, which in an embodiment of the invention is located in the back part of the box.

Figure 16:
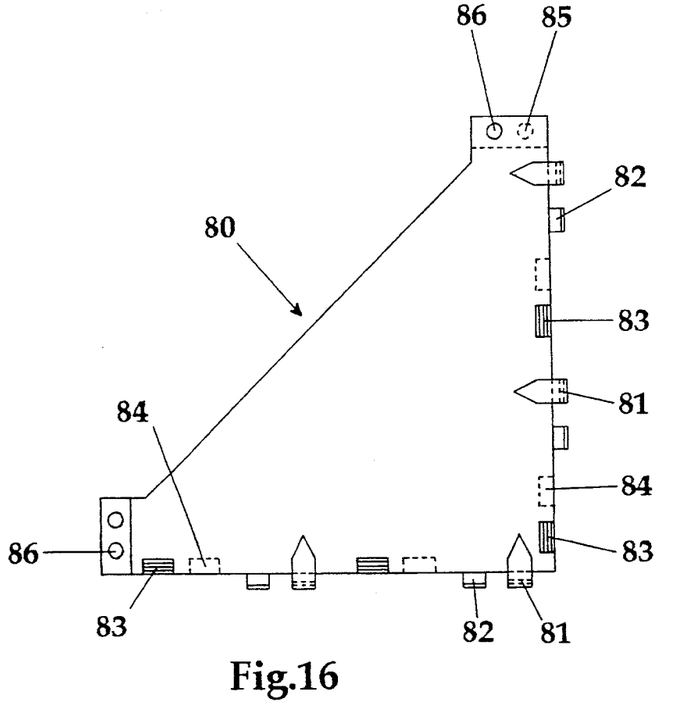
FIG. 16 is a front view of the reinforcement element of the box.
Figure 17:
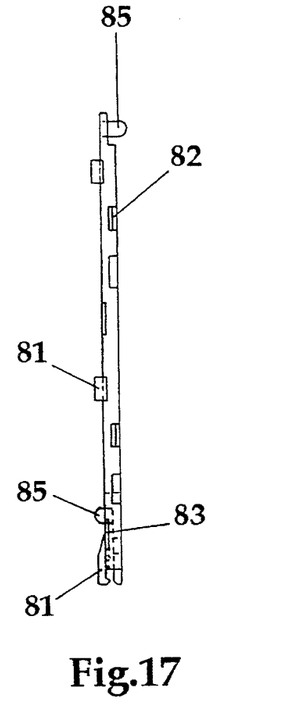
FIG. 17 is a side view of the reinforcement element of the box.
Figure 18:
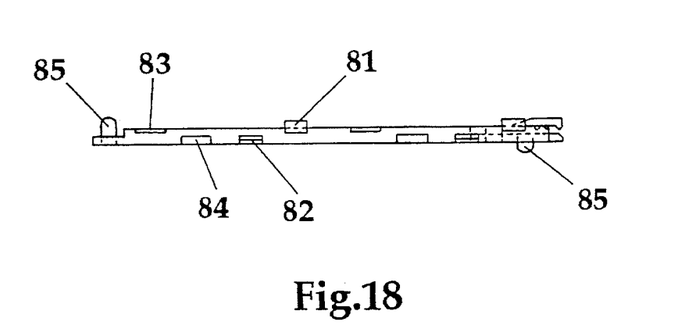
FIG. 18 is a lower view of the element of reinforcement of the box.

The reinforcement element consists in a piece repeatedly placed and having a planar triangle shape, with teeth (81 and 82), alternatively located with some grooves (83 and 84) over respective lengths of the triangle; a pin (85) and a orifice (86) located adjacently in each of the two ends of the reinforcement element (80). This reinforcement element has the purpose of providing greater rigidity to the box due to the possibility of them as anchors in the corners and also as beams when the boxes are too long.

The reinforcement elements are joined to the box to keep compact disks by means of teeth (81 and 82), which enter the grooves (51 and 52) located in the back walls (43 and 44b) of the pieces (50, 60 and 70). On the other hand, the reinforcement elements can be joined one to another when assembling the teeth (81 and 82) with grooves (83 and 84) or when joining the pins (85) with the orifices (86).

Figure 19:
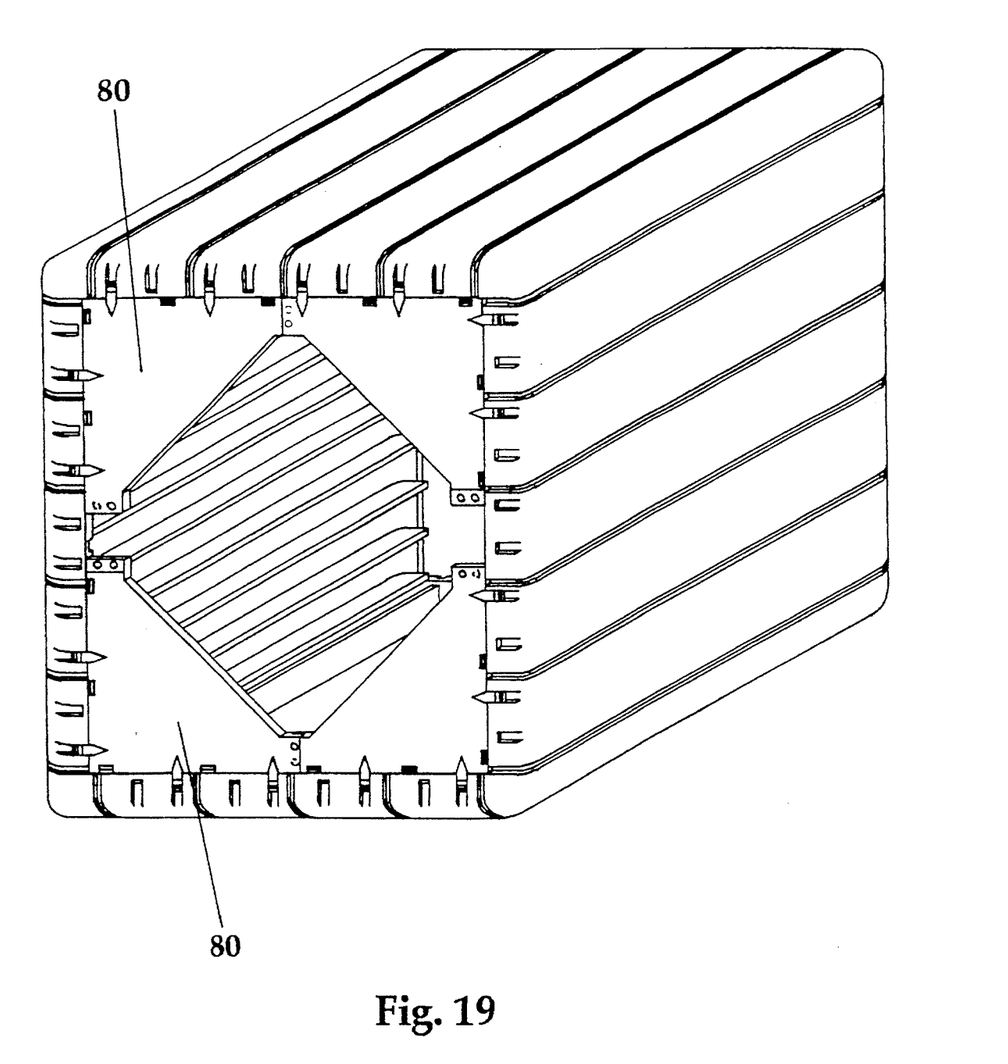
FIG. 19 is a back view of the box assembled with the reinforcement elements functioning as corners.
Figure 20:
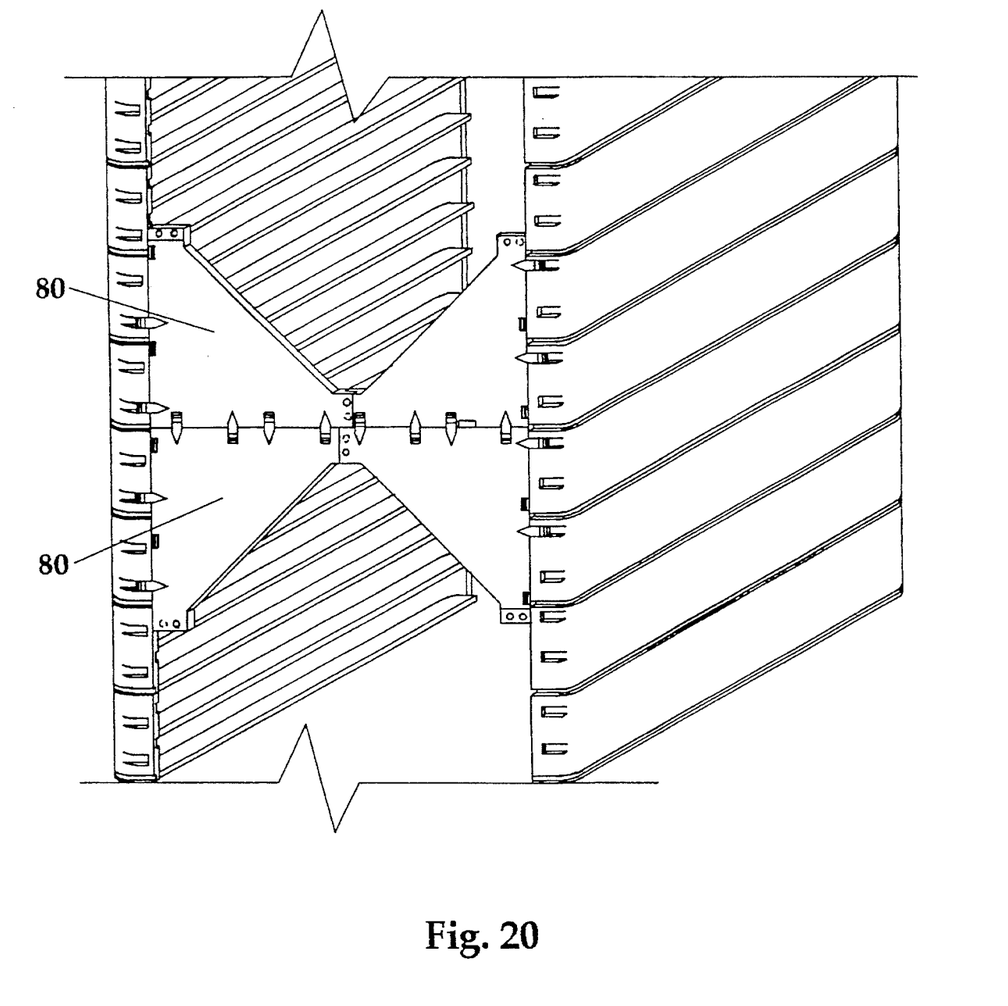
FIG. 20 is a back view of a segment of a box with the reinforcement elements working as a column.

In FIG. 19, it is shown how the reinforcement element (80) is used to reinforce the corners of the box and how these are joined to the box and with other elements (80). In FIG. 20, it can be seen in a segment of a longer box, how four reinforcement elements (80), when joined between them, form a sort of a beam serving to avoid a possible bend in the box to keep the compact disks.

Finally it is important to mention that the details that correspond to the engineering of the pieces as can be small details necessary for its construction and good working of the system, are not herein mentioned.

Having thus described the invention, it is claimed as property that contained in the following

I claim:

1. An assembly box to contain cases for compact discs, audio cassettes or video cassettes, of the type comprising a combination of vertical lateral and rear walls, and horizontal top, intermediate and bottom walls; the box is formed by the assembly of five different types of pieces having a plurality of assembly teeth located at their longitudinal ends, and at least one reinforcement element located at the rear side of the box for providing rigidity thereto; said assembly teeth are of the same size and are located separately at equal distances; said assembly teeth have grip notches which serve to retain one piece with another; at one of the ends of any of said different pieces, it is located and end notch which serves to hold the last assembly teeth of the piece to be assembled; when the pieces are assembled together, the assembly teeth of one piece join the assembly teeth of the other piece, forming edges that serve to retain the cases for compact discs, audio cassettes or video cassettes in place.

2. An assembly box to contain cases for compact discs, audio cassettes or video cassettes according to claim 1, wherein the pieces that form the box are:

a) corner pieces;

b) opposite corner pieces;

c) double disc storing lateral walls;

d) single disc storing lateral walls; and e) base and top pieces.

3. An assembly box to contain cases for compact discs, audio cassettes or video cassettes according to claim 2, wherein the pieces that form the box have assembly teeth located in the longitudinal ends thereof; said assembly teeth are repeated along each one of the pieces and have the same size and are separated at equal distances; each of the assembly teeth has a peak at the beginning of the tooth and a notch at the end thereof; said peaks and notches serve to retain one piece with another; at the end of the longitudinal part of the pieces there are located half peak teeth that serve to retain the last assembly tooth of the piece to be assembled; when the pieces are assembled together, the assembly teeth of one piece joins the assembly teeth of another piece for forming edges that serve to retain the cases for compact discs, audio cassettes or video cassettes in place.

4. An assembly box to contain cases for compact discs, audio cassettes or video cassettes according to claim 2, wherein each of the single disc storing lateral walls have a central vein located lengthwise in the center thereof, which forms a support to retain in place a single compact disc case in channels formed in said pieces.

5. An assembly box to contain cases for compact discs, audio cassettes or video cassettes according to claim 2, wherein the double disc storing lateral walls have a planar central surface that provides a free space suitable to contain in place double compact disc cases.

6. An assembly box to contain cases for compact discs, audio cassettes or video cassettes according to claim 2, wherein the corner pieces and the opposite corner pieces have different teeth orientations; both types of pieces have the assembly teeth of one side located in a position perpendicular to the teeth of the opposite side, in such a manner that when conveniently coupled, they allow the joining of the vertical lateral walls with the horizontal base and top pieces.

7. An assembly box to contain cases for compact discs, audio cassettes or video cassettes according to claim 1, wherein the lateral walls are formed by the coupling of single disc storing lateral walls and double disc lateral walls.

8. An assembly box to contain cases for compact discs, audio cassettes or video cassettes according to claim 1, wherein the lateral walls and the base and top pieces are joined to each other by means of corner pieces and opposite corner pieces.

9. An assembly box to contain cases for compact discs, audio cassettes or video cassettes according to claim 7, wherein the lateral walls can be formed using double disc lateral walls or single disc storing lateral walls indistinctly disposed in such a manner as to contain double or single cases.

10. An assembly box to contain cases for compact discs, audio cassettes or video cassettes according to claim 1, wherein the single and double disc storing lateral walls have small walls located in the short ends of such pieces; in one of such ends, there is a front wall having a very small height and forming the front edge of the box, by which the compact disc cases are introduced; at the other short end of the piece, there is another higher wall that serves to retain the compact disc cases in the rear part of the box, in such a manner that they cannot get out by the rear part of the box.

11. An assembly box to contain cases for compact discs, audio cassettes or video cassettes according to claim 1, further comprising reinforcement elements which comprises piece which is located repeatedly and having a triangular planar shape, and having coupling teeth located alternately with coupling grooves located over the respective cathethus of the triangle, and further comprising a bolt and a hole located adjacent to each of the ends of the reinforcement element; said reinforcement elements have as an object to provide for more rigidity to the box when used as anchoring elements at the corners of the box, and also in the manner of beams when the boxes are very large.

12. An assembly box to contain cases for compact discs, audio cassettes or video cassettes according to claim 11, wherein the reinforcement elements are joined to the box for storing compact disc cases by means of the coupling teeth which enter in the grooves located in the walls of the pieces that form the box; further, the reinforcement elements can be joint to each other on assembling the coupling teeth to the grooves or when joining the bolts with the holes in order to provide a reinforcement for anchoring the box already formed and to prevent any bending movement to the sides of the box.

13. An assembly box to contain cases for compact discs, audio cassettes or video cassettes according to claim 1, wherein for forming the vertical side and rear walls, as well as the horizontal top, intermediate and bottom walls, a plurality of double disc storing lateral walls and/or single disc storing lateral walls are joined together until the desired length and height dimensions are achieved; the vertical walls are joined to the horizontal bottom and top pieces by means of corner pieces and opposite corner pieces for forming the box; thereafter the necessary reinforcement elements are located in place for maintaining the box and providing rigidity in order to avoid movements of the box.

* * * * *